(12) United States Patent
Obrist et al.

(10) Patent No.: US 11,705,705 B2
(45) Date of Patent: Jul. 18, 2023

(54) MOUNTING SLEEVE

(71) Applicant: OBLAMATIK AG, Chur (CH)

(72) Inventors: Roland Obrist, Scharans (CH); Daniel Knupfer, Trimmis (CH); Thomas Knupfer, Chur (CH)

(73) Assignee: OBLAMATIK AG, Chur (CH)

( * ) Notice: Subject to any disclaimer, the term of this patent is extended or adjusted under 35 U.S.C. 154(b) by 541 days.

(21) Appl. No.: 16/652,129

(22) PCT Filed: Oct. 4, 2017

(86) PCT No.: PCT/EP2017/075236
§ 371 (c)(1),
(2) Date: Mar. 30, 2020

(87) PCT Pub. No.: WO2019/068324
PCT Pub. Date: Apr. 11, 2019

(65) Prior Publication Data
US 2020/0251891 A1 Aug. 6, 2020

(51) Int. Cl.
*H02G 3/12* (2006.01)
*H01R 13/74* (2006.01)
(Continued)

(52) U.S. Cl.
CPC ............ *H02G 3/121* (2013.01); *H01R 13/74* (2013.01); *H02G 3/04* (2013.01); *H02G 3/22* (2013.01); *H02G 3/32* (2013.01)

(58) Field of Classification Search
CPC .......... H02G 3/121; H02G 3/04; H02G 3/22; H02G 3/32; H01R 13/74
See application file for complete search history.

(56) References Cited

U.S. PATENT DOCUMENTS

| 5,542,859 | A | * | 8/1996 | Ison | H01R 13/74 |
| | | | | | 248/27.1 |
| 5,939,671 | A | * | 8/1999 | Gretz | H02G 3/20 |
| | | | | | 52/39 |

(Continued)

FOREIGN PATENT DOCUMENTS

| EP | 1722453 A2 | 11/2006 |
| FR | 2991114 A1 | 11/2013 |

(Continued)

OTHER PUBLICATIONS

International Search Report for corresponding PCT application No. PCT/EP2017/075236, dated Jun. 4, 2018.

*Primary Examiner* — Paresh Paghadal
(74) *Attorney, Agent, or Firm* — Notaro, Michalos & Zaccaria P.C.

(57) ABSTRACT

A mounting sleeve for mounting in a recess in a wall having a first sleeve with a longitudinal axis, wherein a flange is arranged in the region of a first free end of the first sleeve, the flange projects radially outwards beyond the circumference of the sleeve-shaped body as a result that can abut against an outside of the wall, wherein the mounting sleeve has a second sleeve that is arranged displaceably along the longitudinal axis in the first sleeve and the mounting sleeve has a tensioning element which the two sleeves can be brought from a non-tensioned position into a tensioned position, wherein the first sleeve and/or the second sleeve has at least one clamping element which, in the tensioned position, projects radially outwards beyond the circumference of the body of the first sleeve, as a result of tensioning of the mounting sleeve with the wall can be achieved.

18 Claims, 5 Drawing Sheets

(51) Int. Cl.
   *H02G 3/04*   (2006.01)
   *H02G 3/22*   (2006.01)
   *H02G 3/32*   (2006.01)

(56) References Cited

U.S. PATENT DOCUMENTS 6,189,407 B1 * 2/2001 Champ .................. F16C 1/262
                                                74/501.5 R
9,466,962 B1 * 10/2016 Gretz ..................... H02G 3/088

FOREIGN PATENT DOCUMENTS

WO        9012433  A1   10/1990
WO     2015118241  A1    8/2015

* cited by examiner

MOUNTING SLEEVE

FIELD OF THE INVENTION

The present invention relates to a mounting sleeve for mounting operating elements in a recess in a wall, in particular in sanitary and heating applications.

DESCRIPTION OF THE PRIOR ART

From the prior art, flush-mounted boxes are known, which are arranged and fastened in a wall recess. Fastening is carried out by gluing, clamping or screwing the flush-mounted box to the wall. EP 1 722 453 discloses a flush-mounted box with frontally arranged wings and four screw-adjustable lugs, wherein the wall is clamped between the wings and the lugs. This is a complex construction and only allows the use of such a flush-mounted box for a limited wall thickness range.

DESCRIPTION OF THE INVENTION

It is an object of the present invention to provide a mounting sleeve which is less complex to manufacture and assemble and which can be used together with any type of wall.

This object is solved by a mounting sleeve with the features of claim 1. Further embodiments of the mounting sleeve, an operating element arrangement and a method for using the mounting sleeve are defined by the features of further claims.

A mounting sleeve according to the invention for mounting in a recess in a wall comprises a first sleeve having a longitudinal axis, wherein a flange is arranged in the region of a first free end of the first sleeve, which flange projects radially outwards over the periphery of the sleeve-shaped body, whereby it can abut against an outside of the wall. The mounting sleeve comprises a second sleeve which is arranged in the first sleeve so as to be displaceable along the longitudinal axis and the mounting sleeve comprises a tensioning element with which the two sleeves can be brought from a non-tensioned position into a tensioned position. The first sleeve and/or the second sleeve comprises at least one clamping element which, in the tensioned position, projects radially outwards over the periphery of the body of the first sleeve, whereby tensioning of the mounting sleeve to the wall can be achieved. This design is easy to manufacture and install and can be used with any type of wall. The mounting sleeve can also be reused. All that is required is to release the clamping element, which releases the tensioning between the mounting sleeve and the wall and allows the mounting sleeve to be easily removed from the recess in the wall. As an alternative to a detachable clamping element, a clamping element that cannot be detached non-destructively can also be used. For example, a lug with catches can be used like a cable tie. A ratchet/rod mechanism is another possible clamping element, wherein notches are provided on one side of the rod in which a tightening element can engage and with which the rod can be moved along the longitudinal axis. To release the rod, it can be rotated about the longitudinal axis, thereby releasing the engagement between rod and tightening element. In its simplest embodiment, the mounting sleeve comprises only one clamping element, wherein the clamping element is, for example, a screw. Other clamping elements, such as clamping levers or the like can also be used. There may be more than one clamping element. For example, the first sleeve and/or the second sleeve may comprise two, three, four or more clamping elements. The two sleeves can be made of plastic, such as polyamide or metal. The two sleeves may be essentially circular in cross-section. Alternatively, however, quadrangular, pentagonal or hexagonal cross-sections are also possible, wherein the corners can be angular or rounded. With such polygonal cross-sections, relative rotation of the two sleeves around the longitudinal axis is not possible. The flange can be designed as a closed, circumferential collar. Alternatively, the flange may include interruptions, resulting in flange sections spaced apart from each other.

In one embodiment, the first sleeve comprises at least one first clamping element which, with increasing tensioning, projects increasingly over the periphery of the body of the first sleeve, whereby radial tensioning of the mounting sleeve with the recess of the wall is achievable and/or wherein the second sleeve comprises at least one second clamping element which, with increasing tensioning, projects constantly over the periphery of the body of the first sleeve in a predetermined range, whereby tensioning along the longitudinal axis of the mounting sleeve is achievable at least with an inner side of the wall. As a result of this design, the mounting sleeve can be used together with any type of wall, e.g. together with a building wall, such as a solid wall or a drywall, or together with a wall of a sanitary installation, such as a bathtub wall, a pool wall or a wall of a cover adjacent to it. The length of the area in which the second clamping element projects uniformly over the circumference of the body of the first sleeve can be determined by the free length of the slot in the first sleeve. If there is a first clamping element and a second clamping element, the first sleeve can be tensioned radially outwardly with the recess in the wall as the second sleeve is increasingly tensioned, and the second sleeve can be tensioned by the first sleeve along the longitudinal axis with the recess in the wall. One, two, three, four or more first and second clamping elements may be provided.

In one embodiment, the second sleeve comprises at least one wedge which, as the two sleeves are increasingly tensioned, can deflect the first clamping element increasingly radially outwards and/or the first sleeve comprises at least one ramp which can deflect the second clamping element increasingly radially outwards towards the tensioned position. Since the ramp adjoins the free length of the slot, the second clamping element can only be deflected in an area just before complete tensioning. This means that the second clamping element is constantly deflected over the area of the free slot and can only be increasingly deflected towards the end of the slot. This means that the first clamping element can be tensioned radially outwards against the wall recess from the beginning of the tensioning and the second clamping element can only be moved along the longitudinal axis without the radial clamping increasing, allowing the flange to be pulled against the outer wall surface. Only towards the end of the tensioning range of the mounting sleeve can the second clamping element generate a radially outwardly directed clamping force, which can result in an additional radial clamping with the wall recess. The number of wedges corresponds to the number of the first clamping elements and the number of ramps corresponds to the number of the second clamping elements. This means that one, two, three, four or more wedges and/or ramps can be provided.

In one embodiment, the first sleeve comprises at least one slot extending along the longitudinal axis through which the second clamping element can project outwards. The slot extends over part of the length of the sleeve-shaped body. On the side facing the flange the slot is bounded by a ramp and on the opposite side by a web. More than one slot can be formed. For example, two, three, four or more slots, which may be evenly distributed around the circumference of the first sleeve. The number of slots corresponds to the number of second clamping elements. Accordingly, one, two, three, four or more slots may be provided.

In one embodiment, the first sleeve comprises a web which adjoins the slot in the direction of the longitudinal axis and is opposite the flange. In the non-tensioned position, this web can exert a radially inwardly directed force component on the second clamping element. When the two sleeves are substantially completely moved apart, the second clamping element can be pressed radially inwards with the web, making it much easier to remove the mounting sleeve from the wall recess.

In one embodiment, the first clamping element comprises a lug which is formed integrally with the first sleeve and extends along the longitudinal axis and whose free end is on the side opposite the flange. This design is simple and cost-effective. Alternatively, the lugs can be located on the first sleeve.

In one embodiment, the first clamping element comprises ribs which extend transversely to the longitudinal axis. The ribs can be used to improve fastening in the wall recess.

In one embodiment, the second clamping element comprises a lug which is formed integrally with the second sleeve and extends substantially along the longitudinal axis and whose free end is located in assembly with the first sleeve on the side of the second sleeve facing the flange. This design is simple and cost-effective. Alternatively, the lugs can be arranged on the second sleeve.

In one embodiment, the second clamping element is S-shaped, comprises a first section which adjoins a first end face of the body of the second sleeve and in which the distance of the second clamping element from the longitudinal axis remains substantially the same along the longitudinal axis, comprises a second section which adjoins the first section and in which the distance of the second clamping element from the longitudinal axis increases continuously along the longitudinal axis, and comprises a third section which adjoins the second section and in which the distance of the second clamping element from the longitudinal axis remains substantially the same along the longitudinal axis. This design, when the two sleeves are mounted together, allows the second clamping element to project radially outwards beyond the first sleeve through the slot of the first sleeve. In addition, this design means that the second clamping element can be pressed inwards through the web of the first sleeve in the completely non-tensioned state, that the second clamping element can project consistently beyond the first sleeve over a certain length range and that the second clamping element can be moved outwards through the ramp of the first sleeve in the completely tensioned state.

In one embodiment, an axial stop is provided at the free end of the second clamping element, which is designed as a radial thickening of the free end. This thickening increases the size of the end face of the second clamping element which is directed against the flange during assembly, thus improving the tensioning against the inside wall surface.

In one embodiment, a radial stop is provided at the free end of the second clamping element, which extends in the circumferential direction over a partial area of an end-side face of the second clamping element. The radial stop is designed in such a way that it can act on an inner edge of the wall recess, thereby preventing the second clamping element from spreading further radially outwards from the first sleeve as the tensioning increases.

In one embodiment, a tube connection is provided at a second end face of the body of the second sleeve, which comprises at least one section which extends in a circumferential region from the second end face along the longitudinal axis. The tube connection is designed in such a way that, for example, an empty tube can be arranged on it. The at least one section is a sleeve section and is a partial continuation of the sleeve-shaped body of the second sleeve.

In one embodiment, the tube connection extends substantially over half the circumference of the second end face and comprises a base section and two side sections adjacent thereto and spaced apart therefrom, wherein the dimension along the circumference of the base section is a multiple of the dimensions along the circumference of the side sections. This allows the arrangement of empty tubes with different sized cross-sections. The base section gives the tube connection the necessary stability. The side sections are formed in a flexible way and can be pressed together for a tube with a small cross-section and can be pressed apart for a tube with a large cross-section. The empty tube can be secured to the tube connection with a tube fastener, for example with a cable tie or similar.

In one embodiment, the sections of the tube connection include a fixing groove extending in the circumferential direction. The fixing groove prevents the cable tie from slipping before or after it has been tightened.

In one embodiment, the second sleeve comprises a separation groove extending in the circumferential direction. The separation groove facilitates the separation of a rear area of the second sleeve, which comprises the tube fastener and part of the sleeve-shaped body. Cutting off the rear area reduces the installation depth of the mounting sleeve, making it suitable for use where space is limited.

In one embodiment, the tensioning element is arranged on an inwardly directed collar on the first sleeve and the tensioning element is arranged on an inwardly directed tube on the second sleeve. The arrangement on the inside of the mounting sleeve reduces the space required, which means that the wall recess required for the mounting sleeve can be smaller. The collar and the tube protrude only into a small area of the internal cross-section of the mounting sleeve, thus leaving the larger part of the cross-section free. The larger the cross-section that is left free, the more space is available for guiding wires or cables.

In one embodiment, the collar of the first sleeve comprises a first bore and the tube of the second sleeve comprises a second bore, wherein the tensioning element extends at least partially through both bores. Alternatively, the tensioning element may extend completely through both bores. For example, a bolt may extend through both bores, wherein the bolt head is arranged on the side of the first bore and the thread on the side of the second bore. For example, a nut may be recessed in the second hole. The nut can be made of plastic or metal.

In one embodiment, the first bore comprises a through bore and the second bore comprises a threaded bore. The area of the threaded bore can be made of a stronger material. For example, the second sleeve can be manufactured using a two-component injection molding process.

In one embodiment, a strain relief is arranged on the collar of the first sleeve, which extends from the collar along the longitudinal axis against the flange. A cable can be hooked onto the strain relief, which prevents the cable from being pulled out of the mounting sleeve.

In one embodiment, at least one detent is provided on the collar of the first sleeve, spaced from the sleeve-shaped body, which extends from the collar along the longitudinal axis towards the flange, wherein the detent comprises an outwardly directed detent element at its free end. An operating element which can be inserted into the mounting sleeve can be latched to the detent. Therefore, no further fastening means such as screws or the like are required, making assembly very easy. No special tools are required to fasten an operating element in the mounting sleeve.

An operating element arrangement according to the invention comprises a mounting sleeve according to one of the preceding embodiments and an operating element, wherein the operating element comprises at least one inwardly directed detent element which is latchable with the at least one detent of the first sleeve.

A method according to the invention for using a mounting sleeve according to one of the preceding embodiments, comprises the steps of inserting the mounting sleeve into a recess provided for this purpose in a wall; and tightening of the tensioning element.

If the tensioning element is a screw, tightening can be carried out by turning the screw clockwise.

In one embodiment, the method additionally includes the step of severing the second sleeve at the separation groove.

In one embodiment, the method additionally includes the step of fastening an empty tube with a tube fastener to the fixing groove of the second sleeve.

In one embodiment, the method additionally includes the step of feeding a cable through the two sleeves of the mounting sleeve.

In one embodiment, the method additionally comprises the steps of connecting an operating element to the cable; and arranging the operating element in the mounting sleeve.

SHORT DESCRIPTION OF THE FIGURES

Embodiment examples of the present invention are explained in more detail below using figures. These serve only for explanation and are not to be interpreted restrictively, wherein.

DETAILED DESCRIPTION OF THE INVENTION

Figure 1:
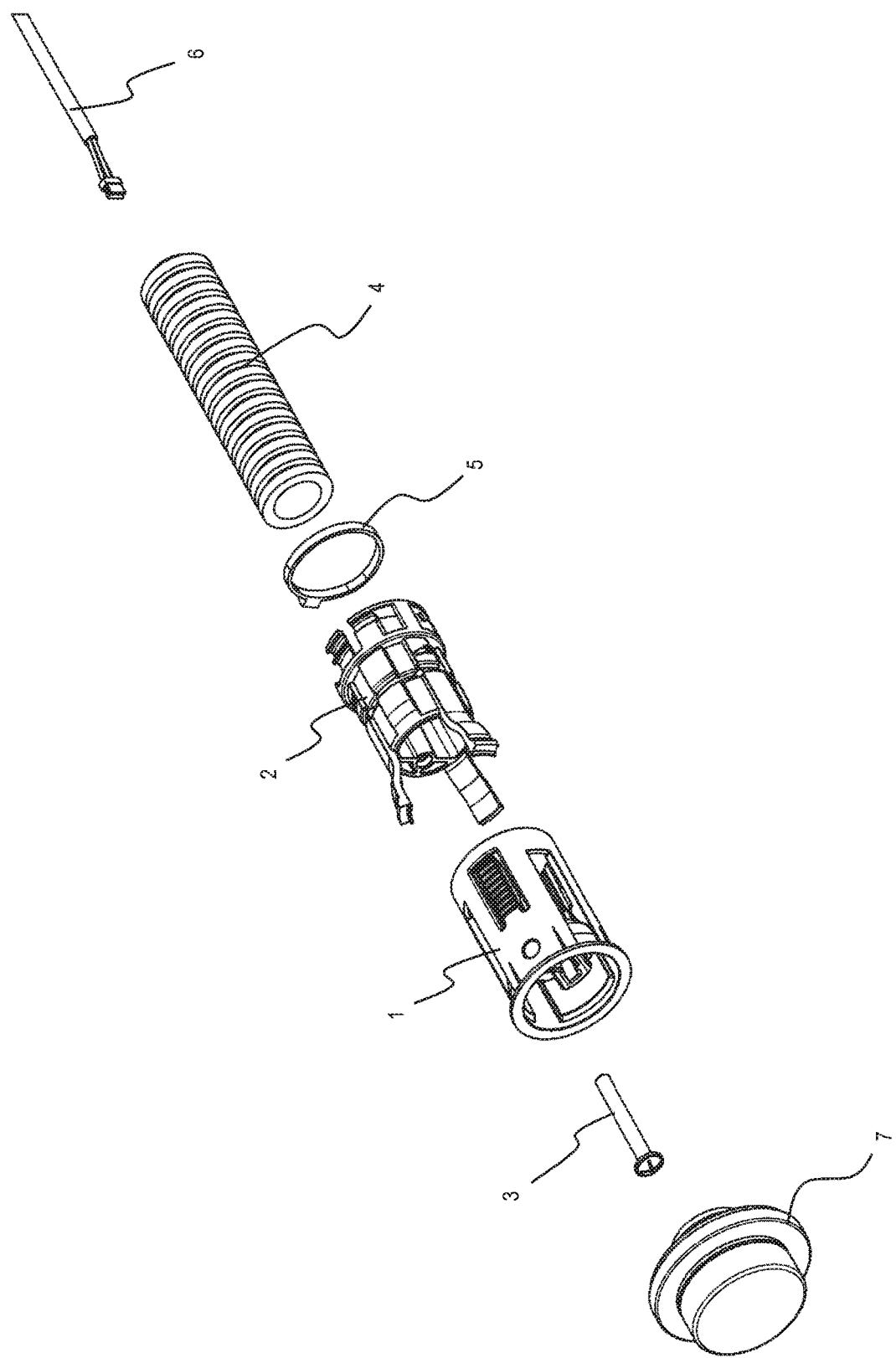
FIG. 1 shows a perspective exploded view of a mounting sleeve according to the invention with empty tube, tube fastener, cable and operating element.

FIG. 1 shows a perspective exploded view of a mounting sleeve 1, 2, 3 according to the invention having an empty tube 4, a tube fastener 5, a cable 6 and an operating element 7. A second sleeve 2 can be inserted into a first sleeve 1 and the two sleeves 1, 2 can be tensioned with a tensioning element 3, wherein the tensioning element 3 shown is a screw.

Figure 2:
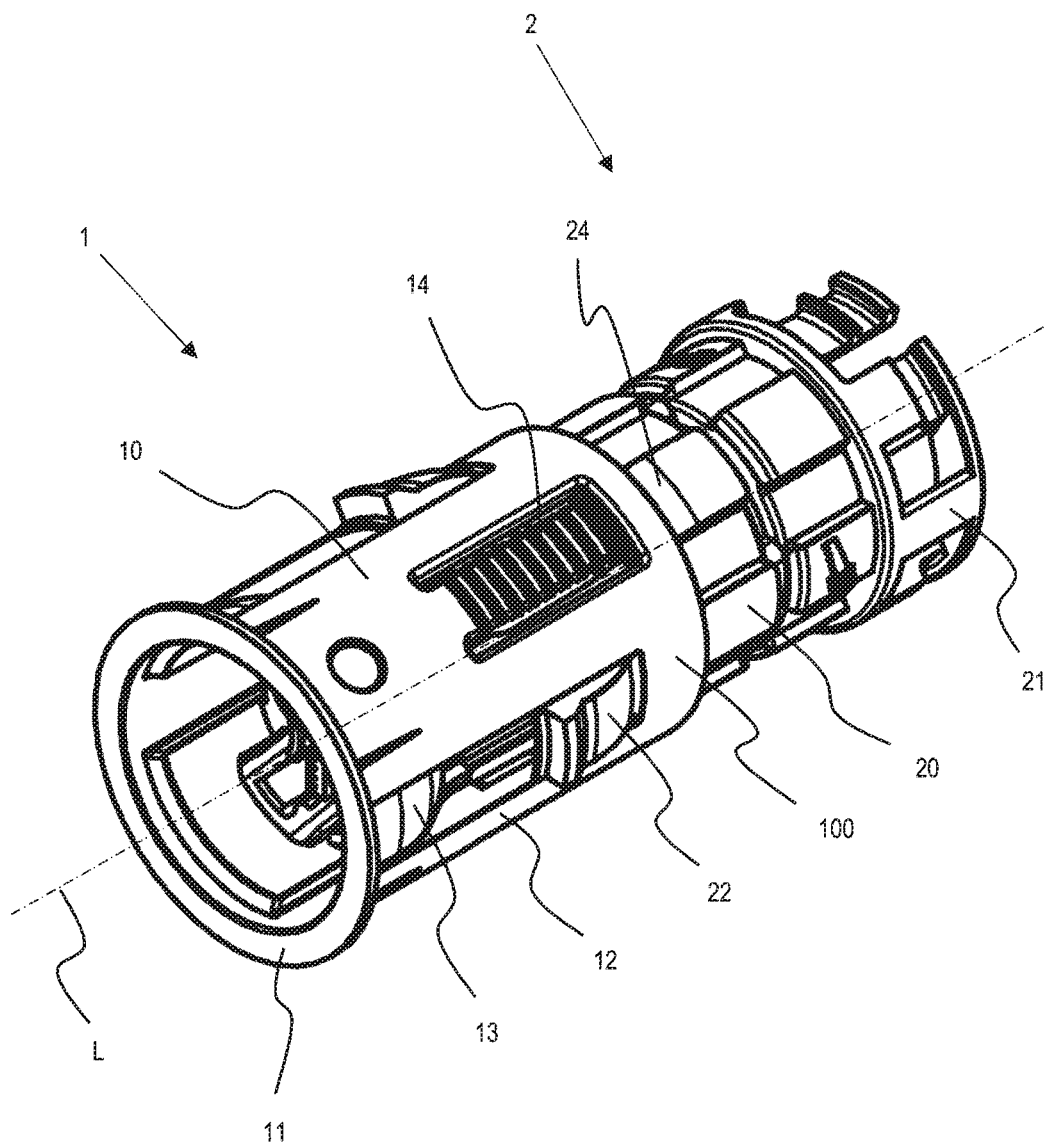
FIG. 2 shows a perspective view of the assembled mounting sleeve of FIG. 1.

FIG. 2 shows a perspective view of the assembled mounting sleeve of FIG. 1. The second sleeve 2 is displaceably arranged in the first sleeve 1 along the longitudinal axis L. The two sleeves each comprise a sleeve-shaped body 10, 20, with an essentially circular cross-section. A flange 11 is located at the front free end of the first sleeve 1. A slot 12 is formed in the first sleeve 1, which extends along the longitudinal axis L. On the side of the flange 11, the slot 12 is bounded by a ramp 13 and on the opposite side by a web 100. Three slots are shown, which are evenly distributed, i.e. every 120 degrees, around the circumference. Between two adjacent slots 12, a first clamping element 14 is formed in the shape of a lug. The lug 14 is formed integrally with the sleeve-shaped body 10. The lug 14 is connected with its front end to the body 10 and has its free end at its opposite rear end. Three lugs 14 are shown, each of which is located between two slots 12, evenly distributed around the circumference. In each case a second clamping element 22 of the second sleeve 2 is aligned with a slot 12 of the first sleeve 1. Each second clamping element 22 is a lug and projects with its front free end through the slot 12 over the body 10 of the first sleeve 1. Each second clamping element 22 is connected with its rear end to the sleeve-shaped body 20 of the second sleeve 2 and is formed in one piece. One wedge 24 of each second sleeve 2 is aligned with the first clamping element 14 of the first sleeve 1. A tube connection 21 is provided in the rear area of the second sleeve 2.

Figure 3:
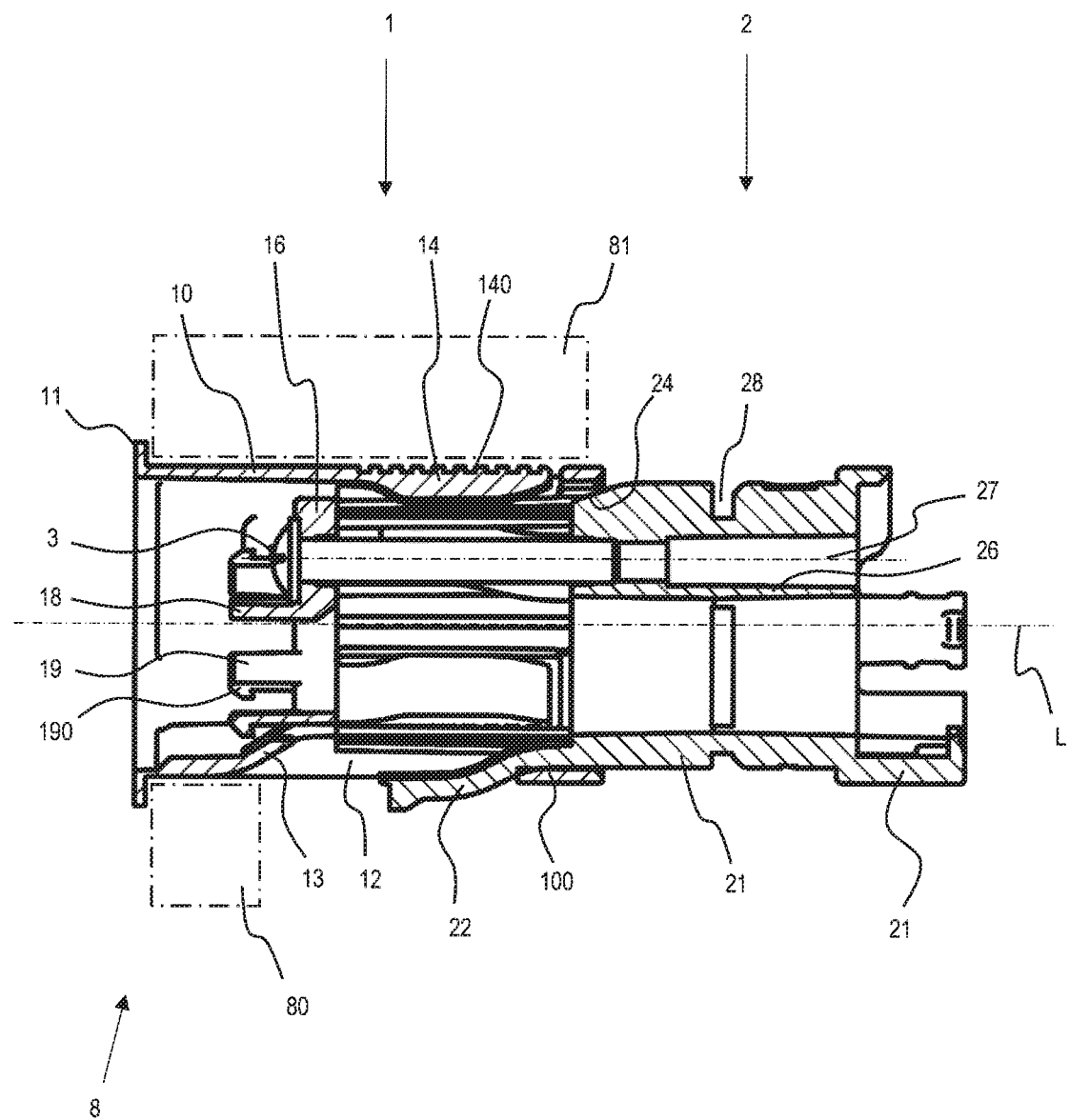
FIG. 3 shows a lateral sectional view through the longitudinal axis of the mounting sleeve of FIG. 2.
Figure 4:
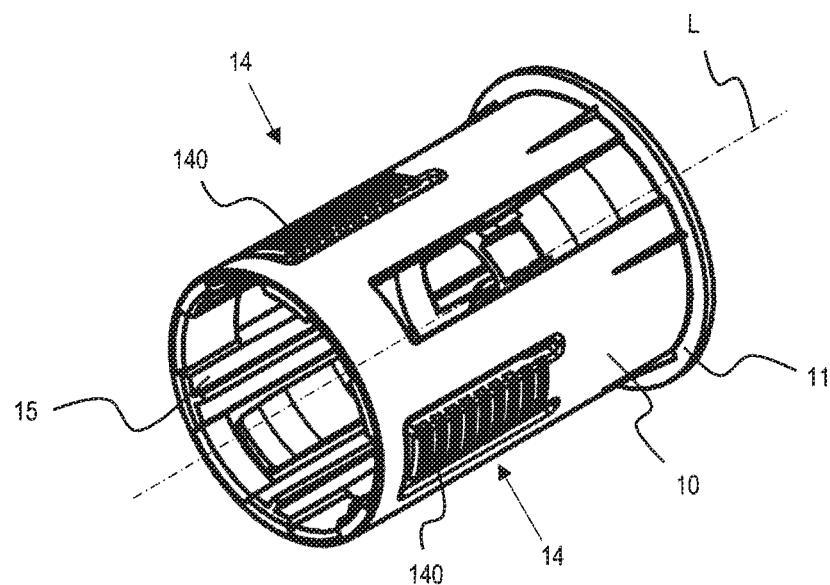
FIG. 4 shows a perspective rear view of a first sleeve of FIG. 3.
Figure 5:
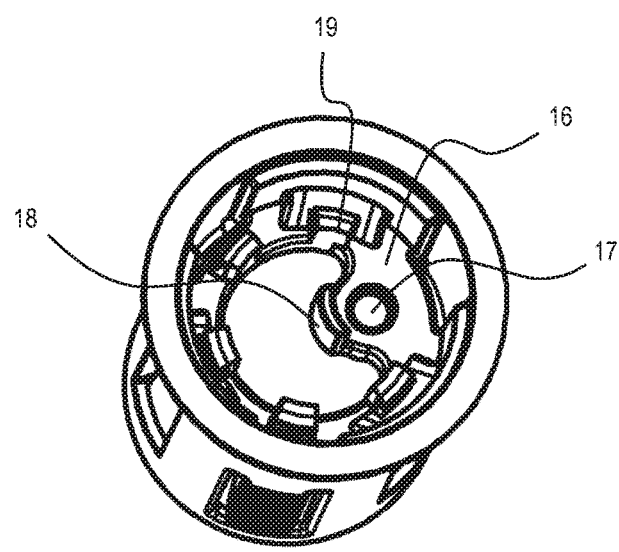
FIG. 5 shows a perspective front view of the first sleeve of FIG. 3.
Figure 6:
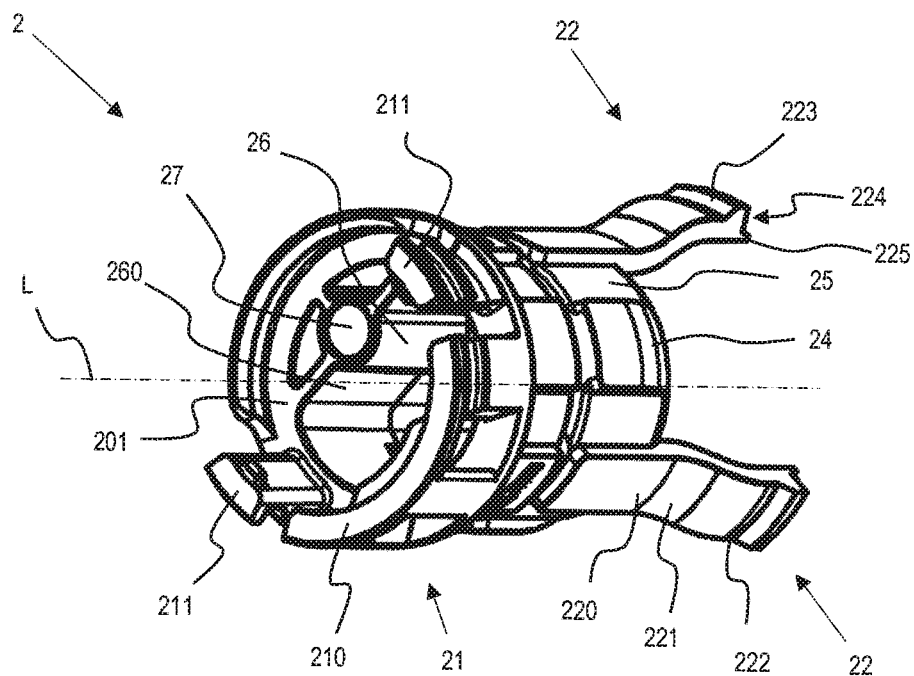
FIG. 6 shows a perspective rear view of a second sleeve of FIG. 3.
Figure 7:
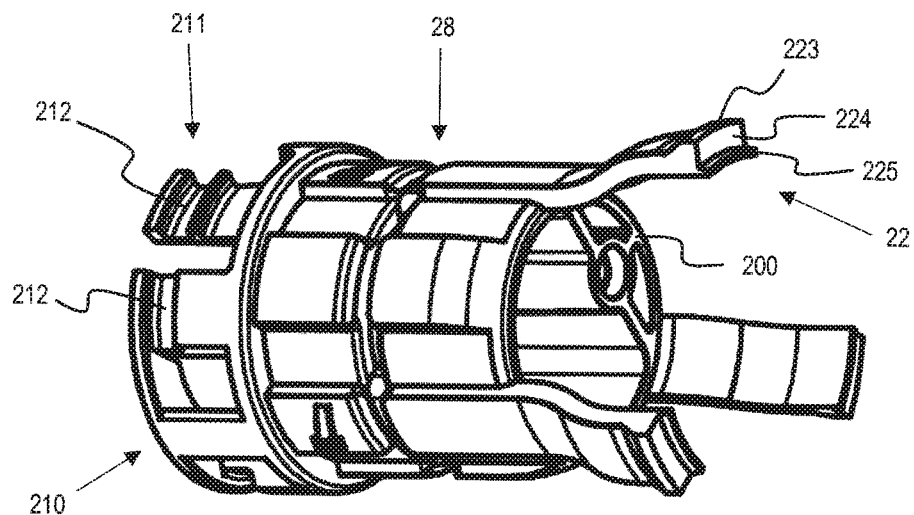
FIG. 7 shows a perspective front view of the second sleeve of FIG. 3.

FIG. 3 shows a lateral sectional view through the longitudinal axis of the mounting sleeve of FIG. 2, which can be arranged in a lightweight construction wall 80 or in a solid construction wall 81, for example. FIGS. 4 and 5 show perspective views of the first sleeve 1 of FIG. 3 and FIGS. 6 and 7 show perspective views of the second sleeve 2 of FIG. 3. The second sleeve 2 is inserted into the first sleeve 1 along the longitudinal axis L to such an extent that a tensioning element 3 in the form of a screw can engage the first sleeve on its side with the screw head and can engage the second sleeve on its threaded side. On the first sleeve 1, the screw 3 engages on a collar 16 which extends from the first sleeve body 10 substantially perpendicular to the longitudinal axis L towards the inside of the sleeve. The collar 16 is offset slightly forward in relation to the center of the sleeve in relation to the flange 11. The screw 3 is located in a through hole 17 in the collar 16, which is arranged in a bulge of the collar 16 directed against the longitudinal axis. At the end of the bulge directed against the longitudinal axis L, a strain relief 18 is arranged, which is jointly formed integrally with the collar 16. The strain relief 18 comprises a lug which extends from the collar 16 towards the flange 11 along the longitudinal axis L. Detents 19 are formed in a region of the collar 16 directed against the longitudinal axis L. The detents 19 are lug-shaped, are located at the rear end on the collar and are formed in one piece with the collar and extend forward along the longitudinal axis L. At the front end the detents 19 comprise an outwardly directed detent element 190 in the form of a detent nose. The first clamping element 14 extends substantially from the center of the sleeve to almost the rear end of the first sleeve 1. The first clamping element 14 has ribs 140 on its outer side which extend along the circumference. The first clamping element 14 has a thickening relative to the first sleeve body 10, i.e. the wall thickness of the first clamping element is approximately twice as thick as the wall thickness of the first sleeve body. On the circumference opposite the first clamping element 14, slot 12 is formed in the first sleeve body. The slot 12 extends from about the front quarter to slightly over the rear quarter of the first sleeve, forming a web 100 at the rear end of the first sleeve 1. At the front end of the slot, a ramp 13 extends from the sleeve body towards the inside of the sleeve. In the second sleeve 2, a tube 26 is formed which extends along the longitudinal axis L spaced from the second sleeve body 20 in the interior thereof between a front first end face 200 and a rear second end face 201, wherein the tube 26 is connected to the second sleeve body 20 by webs 260. The tube has a second bore 27, which has a thread in the front area into which the screw 3 can be screwed. In the rear area of the second sleeve 2 the tube connection 21 is arranged. The tube connection comprises a part of a sleeve that is set off towards the outside, which is divided into three sections 210, 211, 212. A base section 210 extends over essentially a quarter of the circumference in an area opposite the tube 26. A side section 211 is located on each side, circumferentially spaced from the base section 210. Side sections 211 extend around the circumference to just over half the full circumference. An inwardly directed fixing groove 212 is formed along the outer circumference at a distance from the rear end of the sections of the tube connection. The second clamping element 22 extends from the first end face 200 S-shaped along the longitudinal axis L to the front. The second clamping element comprises a first section 220 which extends from the first end face 200 and which in cross-section is a continuation of the cross-section of the second sleeve body 20. In this section, the distance of the second clamping element to the longitudinal axis remains the same along the longitudinal axis. A second section 221 adjoins the first section 220, wherein in this section the distance of the second clamping element to the longitudinal axis increases continuously along the longitudinal axis. A third section 222 is connected to the second section 221, in which section the distance of the second clamping element to the longitudinal axis along the longitudinal axis remains the same. An axial stop 223 is arranged at the front free end of the second clamping element 22, which is designed as a local radial thickening of the third section 222. A radial stop 225 is arranged at the end face 224 of the third section 222, which is designed as an elevation which extends from the edge of the end face 224 directed towards the longitudinal axis with a thickness along the longitudinal axis L, wherein the thickness of the radial stop 225 is a fraction of the thickness of the axial stop 223. A wedge 24 is arranged between every two second clamping elements 22. This means that in the case of three second clamping elements, each wedge 24 is arranged opposite a second clamping element 22 on the circumference. The wedge extends from the first end face 200 to the rear along the longitudinal axis L, wherein the radial expansion of the wedge is smallest at the first end face 200. If the mounting sleeve is used together with a lightweight wall 80 or a solid wall 81, the mounting sleeve can be inserted into a corresponding recess until the flange 11 abuts against the wall 80. The second clamping elements 22 of the second sleeve 2 are elastic and are pressed inwards by the wall 80 through the slots 12 of the first sleeve 1. Then the screw 3 can be turned clockwise with a suitable screwdriver, which moves the second sleeve 2 forward in the direction of the first sleeve 1. If the mounting sleeve is used with a lightweight wall 80, the first clamping element 14 has practically no or no radial clamping effect if the first clamping element 14, when the mounting sleeve is inserted, is behind the corresponding wall 80. When the screw 3 is tightened, the second clamping element 22 moves along the longitudinal axis L essentially unhindered until it abuts against the inner surface of the lightweight partition wall 81. If screw 3 is tightened further, the second clamping element 22 is tensioned against the wall 80 in the longitudinal direction. The radial stops 225 located at the end face 224 of the second clamping element 22 can engage in the hole in the wall 80 from the rear and prevent the second clamping elements 22 from being pressed outwards during tensioning, thus improving the clamping effect. If the mounting sleeve is to be removed from a lightweight wall 80, the screw 3 can be loosened, thereby moving the second clamping elements 22 backwards. If the screw 3 is almost completely loosened, the second clamping elements 22 of the second sleeve 2 are pressed inwards by the webs 100 through the corresponding slots 12 of the first sleeve 1, whereby the second clamping elements 22 no longer protrude over the body 10 of the first sleeve 1 and the mounting sleeve can be removed from the wall bore essentially unhindered. If the mounting sleeve is used with a solid construction wall 81, the first clamping element 14 has a radial clamping effect and the second clamping element 22 has an axial and a more or less radial clamping effect. When the mounting sleeve is inserted into a wall bore, the second clamping elements 22 are pressed inwards by the wall 80 through the slots 12 of the first sleeve 1, thereby creating a first clamping effect in the bore. When the screw 3 is tightened, the second sleeve 2 moves forward. Since the second clamping elements 22, or the axial stops 223 of the second clamping elements 22 respectively, press against the bore from the inside, the flange 11 is pulled against the wall 81 when the screw 3 is tightened, thereby improving the fit of the mounting sleeve in the wall recess or the bore. If the screw 3 is tightened further, the wedges 24 of the second sleeve 2 are pushed under the corresponding first clamping elements 14 of the first sleeve 1, whereby the first clamping elements 14 are pressed radially outwards and the mounting sleeve is clamped in the wall bore. If the screw 3 is tightened even further, the second clamping elements 22 of the second sleeve 2 are pushed over the corresponding ramps 13 of the first sleeve 1, whereby the second clamping elements 22 are pressed radially outwards and the mounting sleeve is additionally clamped in the wall bore. If the mounting sleeve is to be removed from the bore of the solid construction wall, the screw can be loosened in an anti-clockwise direction, whereby the second sleeve 2 is pushed backwards, whereby the wedges 24 no longer act on the first clamping elements 14 and whereby the ramps 13 no longer act on the second clamping elements 22 and the clamping effect is essentially eliminated. If the screw is loosened further, the second clamping elements 22 are pushed under the webs 100 of the first sleeve 1, whereby the second clamping elements 22 come to lie within the body 10 of the first sleeve 1 and also no longer produce a clamping effect with the bore. The mounting sleeve can then be removed from the bore easily and with little effort.

LIST OF REFERENCE NUMERALS

| | | | |
|---|---|---|---|
| 1 | First sleeve | 22 | Second clamping element |
| 10 | Body | 220 | First section |
| 100 | Web | 221 | Second section |
| 11 | Flange | 222 | Third section |
| 12 | Slot | 223 | Axial stop |
| 13 | Ramp | 224 | End-side face |

-continued

| 14 | First clamping element | 225 | Radial stop |
| 140 | Rib | 24 | Wedge |
| 15 | Guide web | 25 | Guide groove |
| 16 | Collar | 26 | Tube |
| 17 | First bore | 260 | Web |
| 18 | Strain relief | 27 | Second bore |
| 19 | Detent | 28 | Separation groove |
| 190 | Detent element | 3 | Tensioning element |
| 2 | Second sleeve | 4 | Empty tube |
| 20 | Body | 5 | Tube mounting |
| 200 | First end face | 6 | Cable |
| 201 | Second end face | 7 | Operating element |
| 21 | Tube connection | 8 | Wall |
| 210 | Base section | 80 | Lightweight construction wall |
| 211 | Side section | 81 | Solid construction wall |
| 212 | Fixing groove | L | Longitudinal axis |

The invention claimed is:

1. A mounting sleeve for mounting in a recess in a wall (8), comprising:
a first sleeve (1) having a longitudinal axis (L),
wherein a flange (11) is arranged in the region of a first free end of the first sleeve (1), which flange (11) projects radially outwards beyond a circumference of a sleeve-shaped body (10) of the first sleeve (1), as a result of which it can abut against an outside of the wall (8),
wherein the mounting sleeve comprises a second sleeve (2), which is arranged displaceably along the longitudinal axis (L) in the first sleeve (1),
wherein the mounting sleeve comprises a tensioning element (3) with which the two sleeves (1, 2) can be brought from a non-tensioned position into a tensioned position,
wherein the tensioning element (3) is arranged on an inwardly directed collar (16) on the first sleeve (1) and wherein the tensioning element (3) is arranged on an inwardly directed tube (26) on the second sleeve (2),
wherein the first sleeve (1) comprises at least one first clamping element (14) and wherein the second sleeve (2) comprises at least one second clamping element (22), which at least one first clamping element (14), in the non-tensioned position, does not project radially outward beyond the circumference of the sleeve-shaped body (10) of the first sleeve (1), and which at least one first clamping element (14), due to an at least one wedge (24) of the second sleeve (2), in the tensioned position, projects radially outward beyond the circumference of the sleeve-shaped body (10) of the first sleeve (1), and which at least one second clamping element (22), in the tensioned position, projects radially outward beyond the circumference of the sleeve-shaped body (10) of the first sleeve (1) as a result of which tensioning of the mounting sleeve with the wall (8) can be achieved, and
wherein a strain relief (18) is arranged on the inwardly directed collar (16), which strain relief (18) extends from the collar (16) along the longitudinal axis (L) towards the flange (11).

2. The mounting sleeve according to claim 1, wherein the first at least one first clamping element (14), with increasing tensioning from the non-tensioned position towards the tensioned position, increasingly projects beyond the circumference of the sleeve-shaped body (10) of the first sleeve (1), whereby radial tensioning of the mounting sleeve with the recess of the wall (8) is achievable and wherein the at least one second clamping element (22), with increasing tensioning in a predetermined range, projects uniformly beyond the circumference of the sleeve-shaped body (10) of the first sleeve (1), whereby tensioning along the longitudinal axis (L) of the mounting sleeve can be achieved at least with an inner side of the wall (8).

3. The mounting sleeve according to claim 2, wherein the at least one wedge (24), with increasing tensioning, can deflect the first clamping element (14) increasingly radially outward beyond the circumference of the sleeve-shaped body (10) of the first sleeve (1) and wherein the first sleeve (1) comprises at least one ramp (13) which, with increasing tensioning, can deflect the second clamping element (22) increasingly radially outward beyond the circumference of the sleeve-shaped body (10) of the first sleeve (1).

4. The mounting sleeve according to claim 1, wherein the first sleeve (1) comprises at least one slot (12) extending along the longitudinal axis (L) through which the second clamping element (22) can project outwardly.

5. The mounting sleeve according to claim 4, wherein the first sleeve (1) comprises a web (100) which adjoins the slot (12) in the direction of the longitudinal axis (L) and is opposite the flange (11) and which, in the non-tensioned position, can exert a radially inwardly directed force component on the second clamping element (22).

6. The mounting sleeve according to claim 1, wherein the first clamping element (14) comprises a lug which is integrally formed with the first sleeve (1) and extends along the longitudinal axis (L) and whose free end is located on the side opposite the flange (11).

7. The mounting sleeve according to claim 6, wherein the first clamping element (14) comprises ribs (140) extending transversely to the longitudinal axis (L).

8. The mounting sleeve according to claim 1, wherein the second clamping element (22) comprises a lug which is integrally formed with the second sleeve (2) and extends substantially along the longitudinal axis (L) and whose free end, when assembled with the first sleeve (1), is located on the side of the second sleeve (2) facing the flange (11).

9. The mounting sleeve according to claim 8, wherein the second clamping element (22) is S-shaped, comprises a first section (220) which adjoins a first end face (200) of a sleeve-shaped body (20) of the second sleeve (2) and in which the distance of the second clamping element (22) from the longitudinal axis (L) remains substantially the same along the longitudinal axis (L), comprises a second section (221) which adjoins the first section (220) and in which the distance of the second clamping element (22) from the longitudinal axis (L) increases continuously along the longitudinal axis (L), and comprises a third section (222) which adjoins the second section (221) and in which the distance of the second clamping element (22) from the longitudinal axis (L) remains substantially the same along the longitudinal axis (L).

10. The mounting sleeve according to claim 8, wherein at the free end of the second clamping element (22) an axial stop (223) is provided, which is formed as a radial thickening of the free end.

11. The mounting sleeve according to claim 8, wherein a radial stop (225) is provided at the free end of the second clamping element (22), which radial stop (225) extends in the circumferential direction over a partial region of an end-side face (224) of the second clamping element (22).

12. The mounting sleeve according to claim 1, wherein a tube connection is provided at a second end face of the sleeve-shaped body of the second sleeve, which tube connection comprises at least one section, which extends in a region close to the circumference from the second end face along the longitudinal axis (L).

13. The mounting sleeve according to claim 12, wherein the tube connection (21) extends substantially halfway around the circumference of the second end face (201) and comprises a base section (210) and two side sections (211) adjacent and spaced apart therefrom, wherein the dimension along the circumference of the base section (210) is a multiple of the dimensions along the circumference of the side sections (211).

14. The mounting sleeve according to claim 12, wherein the at least one section of the tube connection (21) comprises a fixing groove (212) extending in the circumferential direction.

15. The mounting sleeve according to claim 1, wherein the second sleeve (2) comprises a separation groove (28) extending in the circumferential direction.

16. The mounting sleeve according to claim 1, wherein the collar (16) of the first sleeve (1) comprises a first bore (17) and wherein the tube (26) of the second sleeve (2) comprises a second bore (27), wherein the tensioning element (3) extends at least partially through both bores (17, 27).

17. The mounting sleeve according to claim 16, wherein the first bore (17) comprises a through hole and wherein the second hole (27) comprises a threaded bore.

18. The mounting sleeve according to claim 1, wherein at least one detent (19) is provided on the collar (16) of the first sleeve (1), spaced from the sleeve-shaped body (20) of the second sleeve (2), which extends from the collar (16) along the longitudinal axis (L) towards the flange (11), wherein the detent (19) comprises an outwardly directed detent element (190) at its free end.

\* \* \* \* \*